INVENTOR
WILLIAM F. LUCY
BY: Maybee & Legris
ATTORNEYS

July 1, 1958
W. F. G. LUCY
2,841,052
MILLING MACHINE
Filed Sept. 10, 1956
5 Sheets-Sheet 2
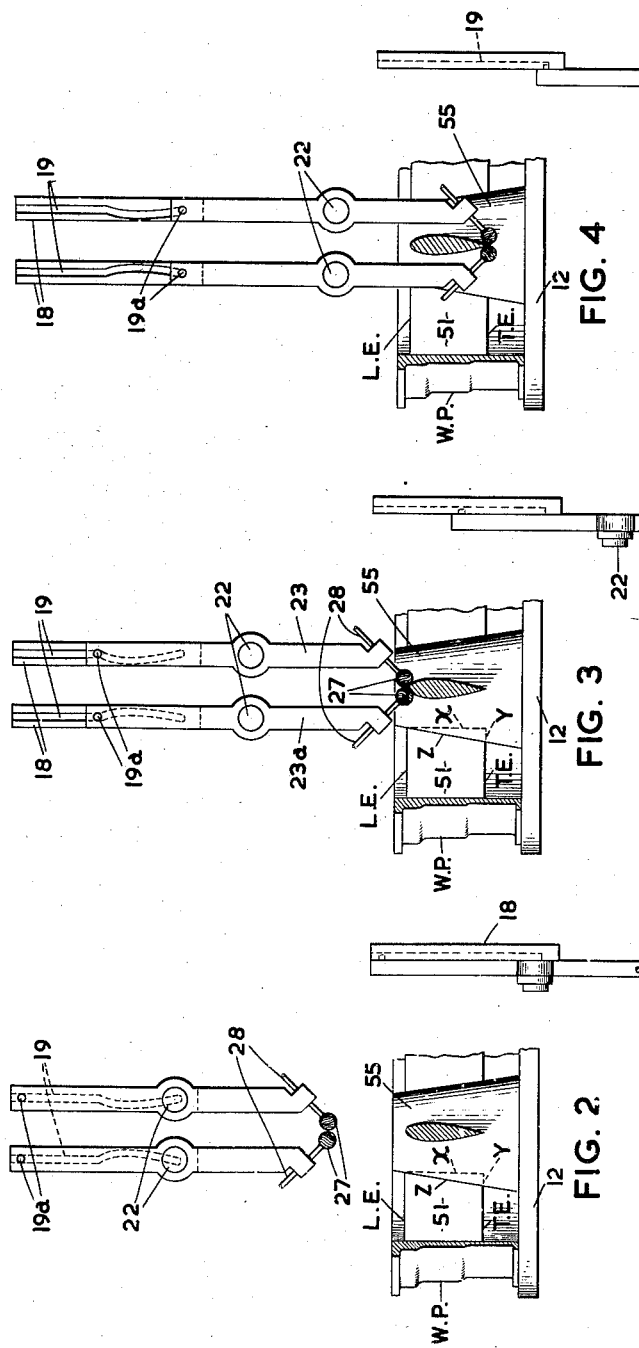
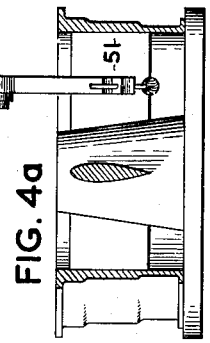
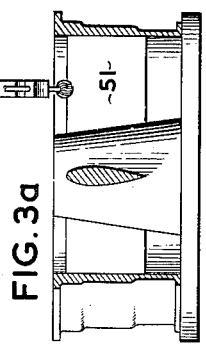
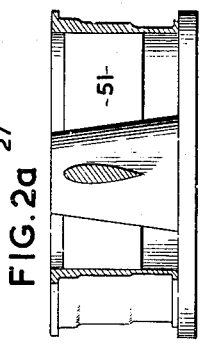
INVENTOR
WILLIAM F. LUCY
BY: *Maybee & Legris*
ATTORNEYS INVENTOR
WILLIAM F. LUCY
BY: Maybee & Legris
ATTORNEYS July 1, 1958 W. F. G. LUCY 2,841,052
MILLING MACHINE
Filed Sept. 10, 1956 5 Sheets-Sheet 5

INVENTOR
WILLIAM F. LUCY
BY: *Maybee & Legris*
ATTORNEYS

United States Patent Office 2,841,052
Patented July 1, 1958

2,841,052

MILLING MACHINE

William F. G. Lucy, Richmond Hill, Ontario, Canada, assignor to Orenda Engines Limited, Village of Malton, Ontario, Canada, a corporation Application September 10, 1956, Serial No. 608,903

2 Claims. (Cl. 90—13)

This invention relates to milling machines and in particular to a milling machine adapted to reproduce in a workpiece the three dimensional contours of a template.

Metal working techniques have undergone rapid development in recent years in particular under the influence of the aircraft industry which has been forced to devise machines capable of performing milling operations of ever increasing complexity.

The milling machine of the present invention is capable of performing milling operations which cannot be accomplished by commercially available machines.

Such an operation arises in the milling of the radial supporting struts of an air intake casting for gas turbine engines. Such an air intake casting comprises a generally cylindrical outer member, axially located within which is a conical central hub supported from the cylindrical outer member by means of four equally spaced vanes. These vanes are customarily of airfoil cross-section, having their leading edge extending in the direction of the apex of the central conical hub. As a result, if the supporting struts are to be milled in a direction parallel to their axes the stroke of the milling cutter must be altered as the cutter moves from the leading edge towards the trailing edge in order to compensate for the slope of the conical central hub.

It is, therefore, an object of the present invention to providing a milling machine which is capable of automatically performing the milling operation outlined above. In order to perform this operation it is necessary to provide means in the machine to vary the horizontal stroke of the cutter in response to cutter movement from the leading edge towards the trailing edge to compensate for the variation in length of the supporting strut along the point of juncture between the strut and the central hub.

Other objects and advantages of the invention will become apparent from the following description of the preferred embodiment which is illustrated in the accompanying drawings in which like reference numerals denote like parts in the various views and in which:

Figures 2, 2a, 3, 3a, 4 and 4a are fragmentary views partly in section showing three stages in the sequential operation of the machine;

For convenience and simplicity the description of the machine, its construction and operation will be divided into several sections and for the purpose of providing a structural background with which the electrical and hydraulic circuits may be associated the mechanical construction of the machine will be described first.

Mechanical

Figure 1:
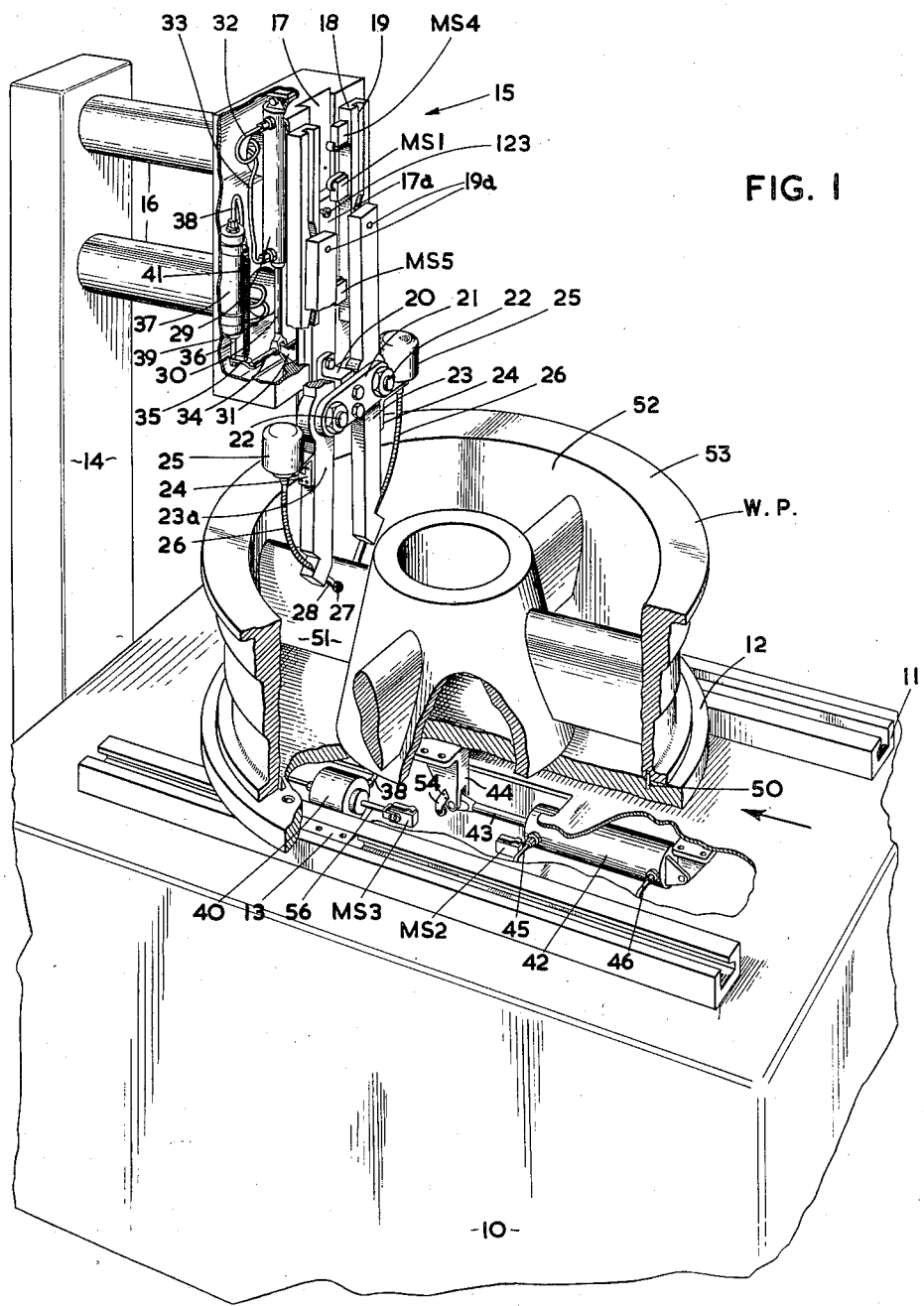
Figure 1 is a general perspective view of a milling machine partly cut away and made in accordance with the present invention.

Referring to Figure 1 the machine will be seen to comprise a base 10 upon which are mounted a pair of parallel ways 11 upon which rides a table 12 which is mounted upon way blocks 13. A vertical support member 14 is provided at one end of the ways and supports a cutting head indicated generally at 15 by means of horizontally extending arms 16. The cutting head carries all the mechanism associated with the cutters themselves and is provided with ways 17 within which rides a block 17a to which is secured the cutting assembly.

Mounted on the cutting head and on each side of the vertical ways 17 is secured a template or pattern 18 which is provided with a groove 19 which, for part of its length, lies parallel to the ways 17 and, for the remainder of its length, is curved in accordance with the contour which it is desired to impart to the workpiece.

The cutting assembly consists of a block 20 which is secured to the way block 17a adjacent its lower edge. Secured in turn to the block 20 is a substantially horizontal bar 21 which carries, at either end, a pivot shaft 22 about each of which is mounted for pivotal movement a cutting arm 23 and 23a. Secured to the outside faces of the portion of cutting arms 23 and 23a below the pivot points 22 is a bracket 24 upon which is mounted an electric motor 25 which drives, through flexible shaft 26, a cutting element 27 which may conveniently be of the "ball cutter" type. The ball cutters 27 are mounted upon rigid shafts 28 which are inclined from the vertical at an angle which is adapted to provide the most efficient cutting effect for their cuting surfaces. This angle forms no part of the present invention and can be readily determined from the technical literature available from the manufacturer of this type of cutting element.

The cutter arms 23 and 23a extend upwardly from the pivot points 22 and are provided, on the surfaces adjacent the patterns or templates 18 with pins 19a which are adapted to seat within the grooves 19. The distance from pivot point 22 to cutter 27 on each cutter arm is equal to the distance from pivot 22 to the pins 19a which lie in the grooves 19 so that as the cutter arms are caused to pivot about shaft 22 when the cutting assembly moves along ways 17 due to the curvature of the grooves 19, the movement imparted to the cutters will be equal and opposite to the movement imparted to the pins. It will be seen from Figures 1, 2, 3 and 4 that the curves of grooves 19 in the templates or patterns 18 are enantiomorphous to the curvature which it is desired to impart to the workpiece.

Lying within the cutting head 15 and secured thereto is an hydraulic cylinder 29 which is provided with a piston and piston rod 30 which is secured, at its lower end, to a bracket 31 which extends rearwardly from the way block 17a and is, therefore, capable of controlling the vertical movement of the way block and, hence, the cutting assembly. The hydraulic cylinder 29 is connected, by means of hydraulic conduits 32 and 33 to a source of fluid pressure (not shown) through a series of solenoid controlled valves (not shown).

Extending laterally from the lower end of the piston rod 30 is a stub shaft 34 which is in mechanical engagement with a bracket 35 secured to the lower end of a piston rod 36 extending from a second hydraulic cylinder 37. Hydraulic cylinder 37 is connected, by means of conduits 38 and 39 to a third hydraulic cylinder 40 which lies beneath the reciprocating work table 12. A spring 41 biasses the piston rod 36 in a direction opposite to that in which it is urged during the vertically downward movement of the cutting assembly.

Lying beneath the horizontally reciprocatable table 12 is a fourth hydraulic cylinder 42 which is connected by means of piston rod 43 and bracket 44 to the lower side of the table 12. Hydraulic leads 45 and 46 carry fluid to the piston to actuate it to cause the horizontal reciprocation of the work table. Electrical switches constituting stop means are mounted beneath the table as well and are contacted by an extension on the bracket 44 to enable electrically operated hydraulic valves to control the flow of fluid to cylinder 42 so as to cause its cyclic reversal of direction to cause a reciprocating movement in the table 12.

Hydraulic system

Figure 5:
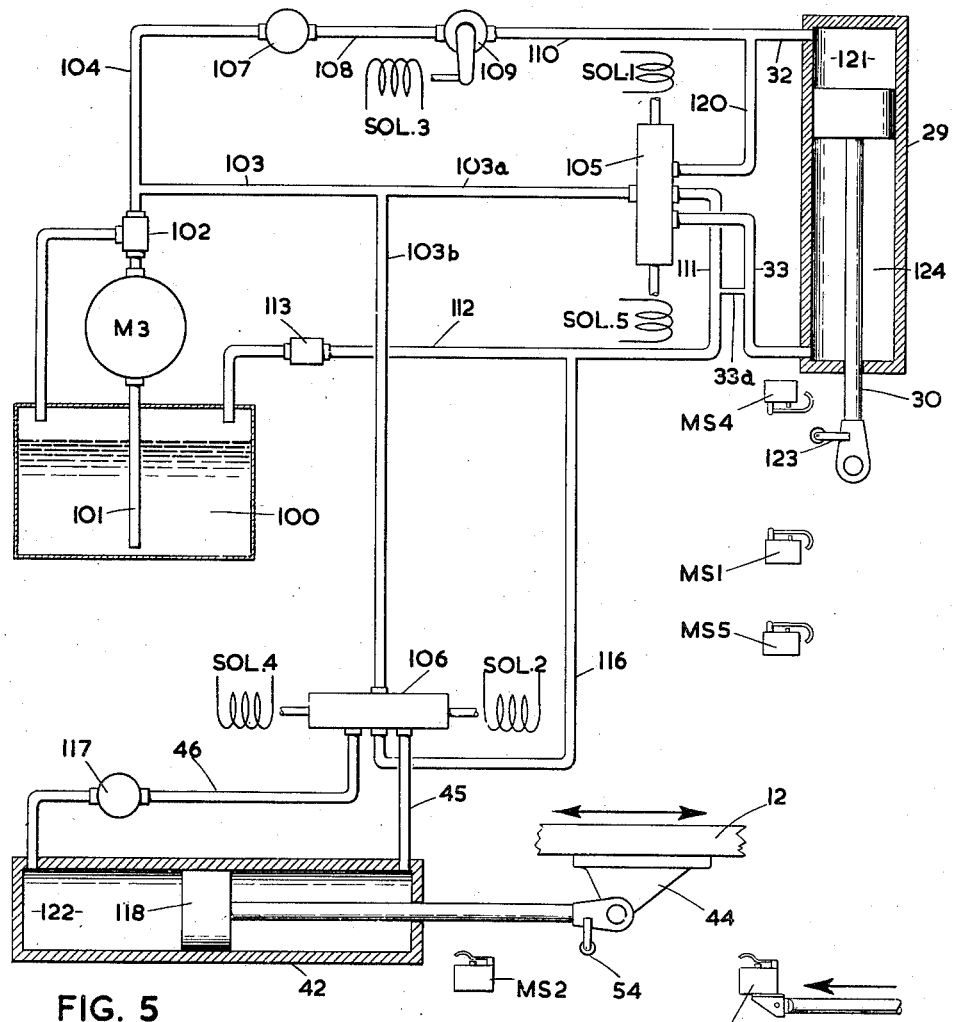
Figure 5 is a schematic view of the hydraulic control system of the machine.
Figure 5A:
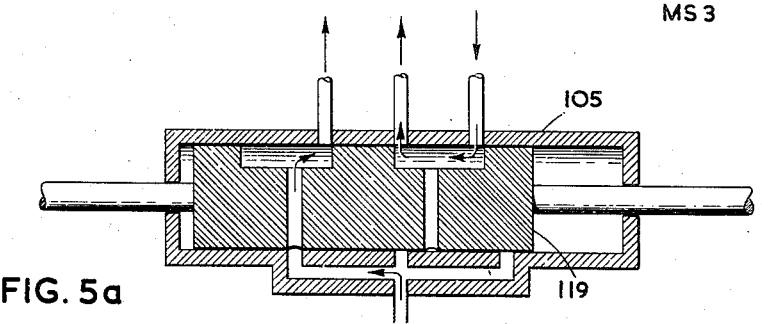
Figure 5a is a detailed view showing one form which the two-way valves may take.
Figure 7:
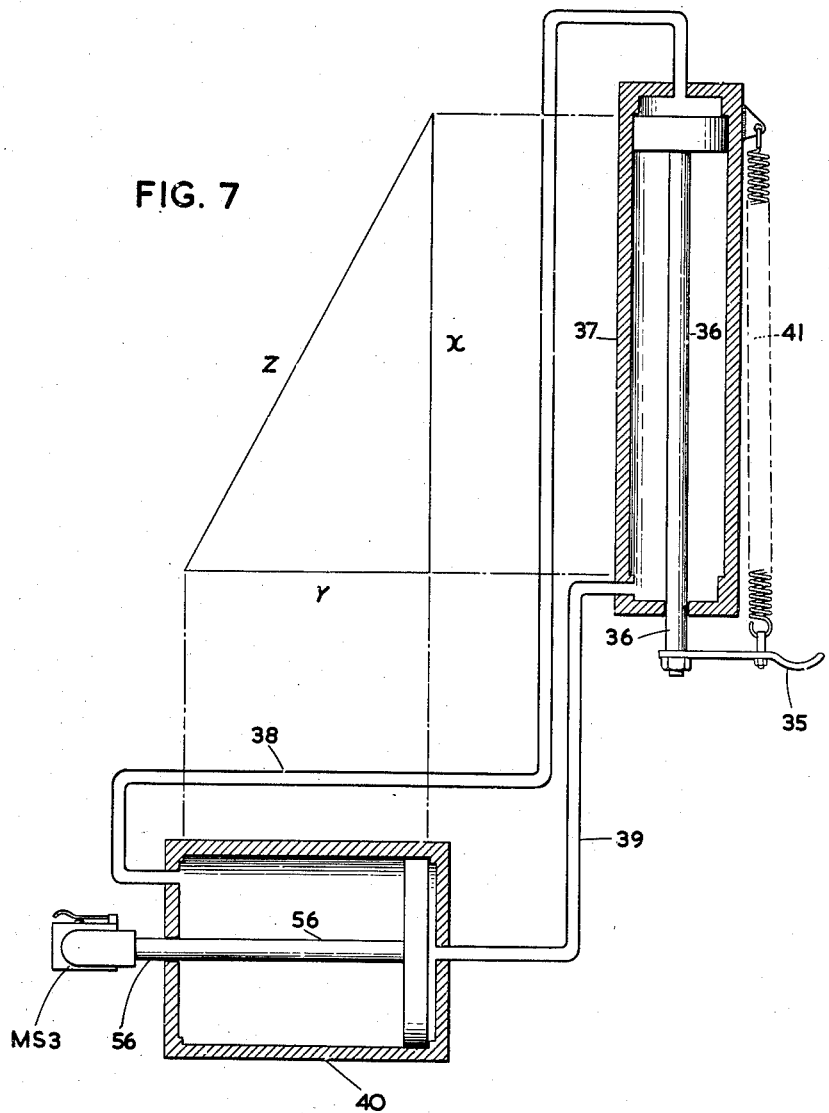
Figure 7 is a schematic view of a portion of the hydraulic control system.

Referring now to Figures 5, 5a and 7 the hydraulic circuit associated with the machine will be described in detail.

Referring first to Figure 5 it will be seen that a hydraulic reservoir 100 supplies fluid to a pump and motor assembly M3 by means of conduit 101. The pump and motor assembly M3 supplies hydraulic fluid through a pressure relief valve 102 to a branched conduit 103 and 104. Conduit 103 is further branched to 103a and 103b, conduit 103a leading to an electrically operated two-way valve 105 which is associated with cylinder 29, conduit 103b leading to a two-way valve 106 which is associated with hydraulic cylinder 42. Conduit 104 supplies high pressure fluid through a hand operated feed valve 107 which controls the rate to flow of fluid and which in turn, through conduit 108 delivers fluid to an electrically operated one-way valve 109 which leads through conduit 110 to conduit 32 which supplies fluid to cylinder 29. Return fluid from cylinder 29 passes through conduit 33 back to the two-way valve 105 or through conduit 33a where it is delivered to conduit 111 and returned to the fluid reservoir 100 through conduit 112 and through a flow restricting valve 113 adapted to maintain a given minimum pressure within the system.

When valve 105 is in its neutral position no fluid can flow through it either to or from the cylinder 29. Accordingly, since valve 105 will always be in the neutral position when valve 109 is opened, an alternative route for return fluid from cylinder 29 must be provided. This is accomplished by a small diameter conduit 33a which leads from line 33 to line 111, bypassing valve 105. When valve 109 is opened, fluid will flow into chamber 121 and return fluid from chamber 124 will pass through line 33, 33a, 111 and 112 to the reservoir 100. Conduit 33a is of a smaller diameter than lines 33 or 32 and, accordingly will not have any material effect upon the operation of cylinder 29 under the influence of valve 105 since the movement of the piston within cylinder 29 under the influence of fluid supplied by valve 105 is substantially without load. The movement of the piston within cylinder 29 under the influence of fluid supplied through valve 109 is for the purpose of feeding the cutters into the workpiece and a substantial load may be encountered during this movement. The fast down traverse or the return traverse of the cutting assembly which is caused by the opening of either of the two sections of two-way valve 105 is a substantially zero load movement and the leakage through conduit 33a will not have any material effect.

Two-way valve 106, which is also an electrically operated valve supplies fluid alternatively through lines 45 and 46 to opposite sides of cylinder 42. Return fluid from cylinder 42 is delivered to two-way valve 106 and returned to the reservoir 100 by means of return conduit 116. A hand operated feed valve 117 is placed in line 46 to restrict either the entry or exit of fluid from cylinder 42 thereby controlling the speed at which the table 12 will move under the influence of the hydraulic pressure.

Referring now to Figure 5a one form which the two-way electrically operated valves 105 and 106 may take is illustrated and, from the drawing, it will be seen that the valve is of conventional construction having a plurality of inlet and outlet ports which may be connected to the desired conduits by moving the valve element 119 from one to the other of its two alternative positions.

Referring to Figure 7 cylinders 40 and 37 are shown as being connected together in a closed circuit by means of conduits 38 and 39. The cylinders 37 and 40 are of identical volume but of different lengths and diameter. The length of cylinder 37 which is represented by line X is equal to the distance from the leading edge to the trailing edge of the workpiece and the length of cylinder 40 represneted by the length of line Y is equal to the length of the base of the triangle formed by dropping a vertical line from the leading edge of the strut at the point where it joins the conical hub, extending the trailing edge of the strut, the third side of the triangle being formed by the surface of the conical hub. Referring to Figures 2 and 3 this triangle can be seen as having sides X, Y and Z, side Z being formed by the surface of the conical central hub. The function of this closed hydraulic circuit will be more fully described in relation to the electrical circuit and the operation of the machine.

Electrical circuit

Figure 6:
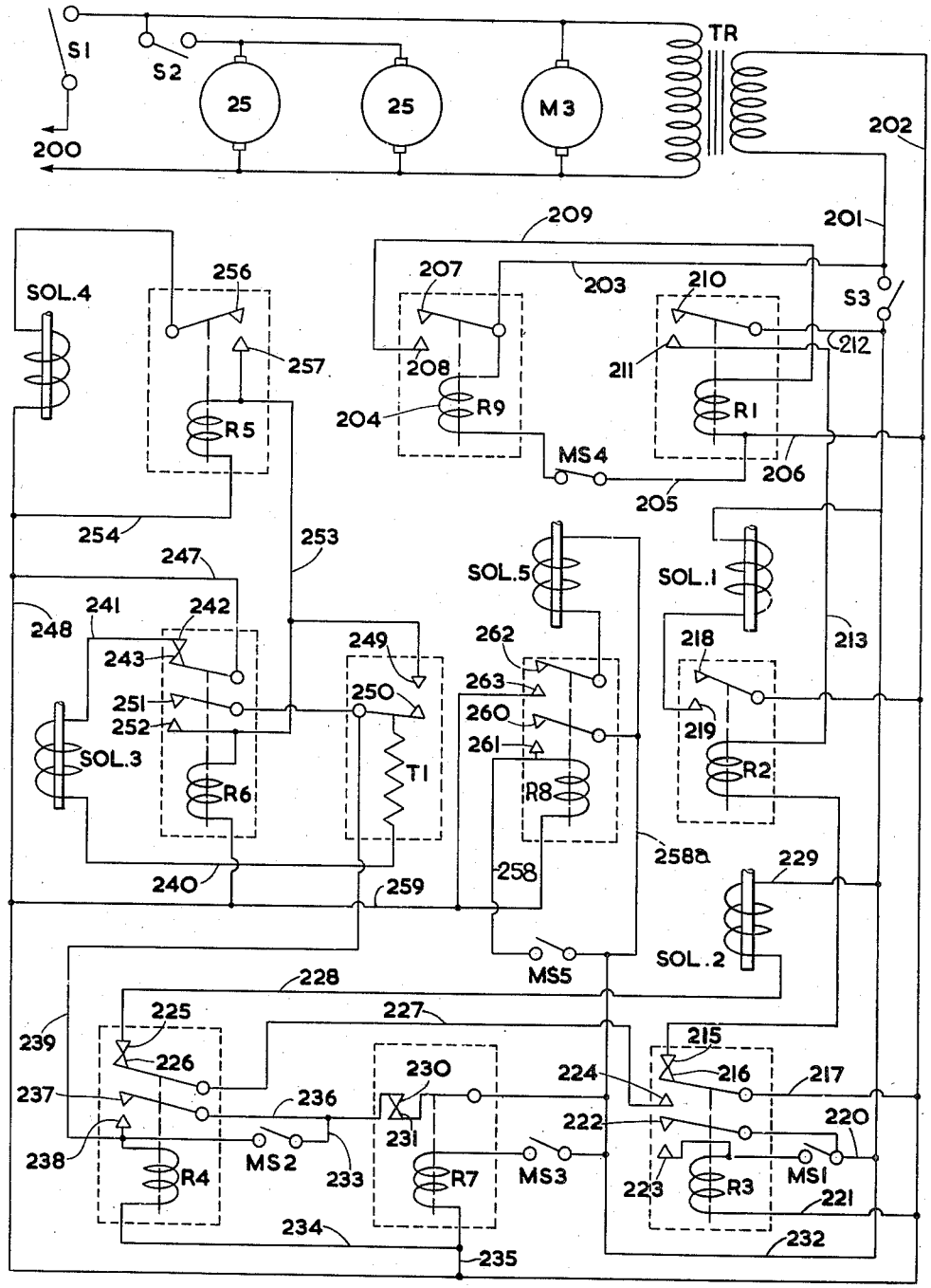
Figure 6 is a schematic diagram of the electrical circuit associated with the hydraulic control mechanism.

Referring now to Figure 6 the electrical circuit which integrates the hydraulic and mechanical functions of the machine will be described.

A step down transformer TR is connected to a source of power 200, a master switch S1 being inserted in series, the pair of cutter motors 25 lying in a separate parallel circuit with the transformer TR and controlled by a switch S2. Motor M3 which is associated with the pump motor mechanism in the hydraulic circuit lies in parallel with the transformer TR and is controlled by the master switch S1. Thus, when master switch S1 is closed, electrical energy from source 200 will energize motor M3 and the hydraulic pump will begin to build pressure. Transformer TR will supply current at a lower voltage to the remainder of the electrical system.

The low voltage from transformer TR is transmitted through conduits 201 and 202 to a pair of relays R1 and R9. Conduit 201 feeds, through conduit 203, the actuating coil 204 of relay R9 which is connected through microswitch MS4, lead 205 and 206 to lead 202, thereby completing a circuit to relay R9. With relay R9 energized, contacts 207 and 208 will be closed thereby delivering current through lead 209 to relay R1, thereby closing contacts 210 and 211. A normally open pushbutton switch S3 is inserted in line 201 at a point in line 201 further from the transformer TR than the connection with line 203. When switch S3 is closed current flows through line 212, through contacts 210 and 211, through line 213 to relay R2, the circuit to relay R2 being completed through the normally closed contacts 215 and 216 of relay R3 and conduit 217. This energizes relay R2 which closes contacts 218 and 219 to energize solenoid 1 which, from a consideration of Figure 5 will be seen to open one half of electrically operated valve 105 to admit fluid to line 120 which feeds fluid to conduit 32 to cause piston rod 30 to move downwardly thereby feeding the cutters towards the work.

The next step in the sequential operation of the machine will be the tripping of microswitch MS1 which makes and then breaks. This delivers current through conduits 220 and 221, through microswitch MS1 to relay R3 which energizes this relay which closes contacts 222 and 223 thereby locking the relay in the energized position and opening contacts 215 and 216 which de-energizes relay R2 thereby de-energizing solenoid 1. Contact 216 moves from its connection with contact 215 to engage contact 224 which, through the normally closed contacts 225 and 226 of relay R4 energizes solenoid 2 through lines 227 and 228 and 229. Solenoid 2, from Figure 5 will be seen to control two-way valve 106 and admits fluid through line 45 to cylinder 42 which initiates the reciprocation of the table 12.

As the table 12 is moving to the left in Figure 5 it will ultimately contact microswitch MS2 which, as will be seen from Figure 6, will close to energize relay R4 through the normally closed contacts 230 and 231 of R7 by means of leads 232, 233, MS2, lead 234 and 235. Relay R4 will lock in the energized position through conduit 236 and contacts 237 and 238 and will open contacts 225 and 226 thereby de-energizing solenoid 2.

The closing of contacts 237 and 238 will supply current through conduit 239 to the hot wire switch T1 the circuit to which is completed by conduit 240, solenoid 3, conduit 241, the normally closed contacts 242 and 243 of relay R6, conduit 247 and 248. The hot wire switch T1 consists of a fine wire which will heat under the influence of the current passing through it and will expand in length thereby closing the contacts 249 and 250 after a predetermined time interval. This predetermined time interval will be that period during which solenoid 3 is energized since the closing of contacts 249 and 250 will energize relay R6 thereby closing contacts 251 and 252 and opening contacts 242 and 243 to de-energize solenoid 3. Solenoid 3, as will be seen from Figure 5 controls the admission of fluid to chamber 121 of cylinder 29 through the hand operated feed valve 107 which controls the rate of flow. The time interval permitted by hot wire switch T1 will, therefore, control the amount of fluid admitted to chamber 121 of cylinder 29 and will therefore control the extent of downward travel of piston rod 30 and, thus, control the distance that the cutters 27 feed into the workpiece. When the hot wire switch T1 has expanded to close contacts 249 and 250 solenoid 3 will de-energized and the downward movement of the cutters will cease. The closing of contacts 249 and 250 will energize relay R6 which, in turn, will energize relay R5 through contacts 251 and 252, conduits 253 and 254 and 248. Relay R5 will then be energized and will close contacts 256 and 257 to energize solenoid 4 which, as will be seen from Figure 5, will admit fluid through the hand operated feed valve 117 to chamber 122 of cylinder 42 and will therefore cause table 12 to move to the right in Figure 5 or, in other words, in the direction opposite to that in which it started.

As table 12 is moving to the right in Figure 5 it will ultimately contact microswitch MS3 which, in Figure 6, will be seen to control relay R7. When MS3 is closed it will open the contacts 230 and 231 of relay R7 which will de-energize relay R4. De-energizing relay R4 will allow contacts 225 and 226 to close which will re-energize solenoid 2 which will cause the table 12 to return in the direction from which it came. At the same time, the circuit to R6 will be opened thereby de-energizing relay R6 which, in turn, will de-energize relay R5 thereby resetting the entire operation to enable it to recycle over again from the point at which the operator pressed the button S3. However, since microswitches MS2 and MS3 are now the controlling factors the machine will continue to recycle with the actuation of microswitch MS2 energizing the hot wire switch T1 which will cause the cutters to feed downwardly into the work for a predetermined time interval, at the end of which time relay R5 will be energized to cause the table to return in the opposite direction. When the table reaches the end of its travel in this direction microswitch MS3 will be energized which will cause the immediate return of the table towards microswitch MS2 which will again cause the heating of hot wire switch T1 to operate solenoid 3 to lower the cutters into the work once more.

As the cutters continue their downward movement through the successive cycling of the machine they will ultimately, by means of contact member 123 engage microswitch MS5 which, as seen from Figure 6, will control the energization of relay R8 through conduits 232, microswitch MS5, conduit 258, conduits 259 and 248 which will close contacts 260 and 261 to lock relay R8 in the closed position through conduits 258a and 259 and will also close contacts 262 and 263 to energize solenoid 5. Solenoid 5 admits fluid through conduit 33 to chamber 124 of cylinder 29 to cause the cutters to rise rapidly to the peak of their travel to enable the table of the machine to be reloaded with a new workpiece. At the uppermost extent of their travel the contact member 123 on the cutting assembly will contact microswitch MS4 which will de-energize relay R9 thereby opening contacts 207 and 208 and de-energizing relay R1. This will open contacts 210 and 211 and will prevent the recycling of the machine until the operator presses switch S3 to re-energize solenoid 1 by the actuation of relay R2.

*Operation*

Having now described the mechanical arrangement, the hydraulic system and the electrical circuit associated with the machine, the operation of the device will be described in sequence.

A workpiece WP (Figures 1, 2, 3 and 4) is mounted on the work table 12 and located in position by means of pins 50 so that the strut 51 which is to be machined, lies with its longitudinal axis in a direction parallel to the direction of reciprocation of the table 12. With the workpiece in position on the table 12 the condition of the cutters in relation to the workpiece is as indicated in Figure 2.

The operator then closes switch S1 which energizes motor M3 to build hydraulic pressure in the hydraulic system and energizes the transformer TR to supply electrical energy to the remainder of the electrical control system. Switch S2 may then be closed and motors 25 will be energized to cause the cutters to revolve. The operator then presses the operating switch S3 which energizes solenoid 1 through the closed contacts of relay R1 to cause two-way valve 105 to admit fluid through conduits 120 and 32 to chamber 121 of cylinder 29. The valve 105 is not subject to the flow limitations of the hand operated feed valve 107 and, as a result, fluid is admitted rapidly to chamber 121 to cause the piston rod 30 carrying the cutting assembly to descend rapidly from the position indicated in Figure 2 to the position indicated in Figure 3. When the cutting assembly has dropped to the point indicated in Figure 3 the contact member 123 engages the operating member on microswitch MS1 to close the microswitch to energize relay R3 which, as was described in relation to the electrical circuit, will energize solenoid 2 to cause the table to begin its movement to the right in Figure 1 towards the position in which the vertical wall 52 of the cylindrical outer member 53 will be adjacent the cutters 27. When this point is reached the contact member 54 on bracket 44 will engage the operating arm of microswitch MS2 which constitutes a stop means and which will complete a circuit to relay R4 which will de-energize solenoid 2 and will, through the hot wire switch T1, energize solenoid 3. Solenoid 3 will cause the slow downfeed of the cutters 27 into the work during the time interval permitted by the hot wire switch T1. When the downfeed of the cutters has been completed it will be terminated by the closing of contacts 249 and 250 of the hot wire switch T1 which will energize relay R6 and de-energize solenoid 3. Relay R6 will energize relay R5 to energize solenoid 4 which will cause the travel of the table to the left in Figure 1 during which travel the cutters 27 will make a working stroke along the strut 51. When the cutters have reached the end of their stroke microswitch MS3 constituting a second stop means, will be contacted by arm 54 which will energize relay R7 to open the contacts 230, 231 thereby de-energizing and resetting relays R4, R5 and R6 and returning the table to the position in which the cutters lie adjacent the vertical wall 52 of the workpiece. At this point microswitch MS2 will be operated once more to repeat the energization of hot wire switch T1 and solenoid 3 to permit further vertical downfeed of the cutters 27 by means of cylinder 29 and the table will then travel with the cutters 27 performing their second cutting stroke. Referring now to Figures 1 and 2 it will be seen that the conical surface of the central hub 55 in the workpiece requires that the length of stroke of the table 12 be shortened as the cutters 27 move from the leading edge toward the trailing edge. This is provided for by the closed hydraulic circuit illustrated in Figure 7.

Referring now to Figures 1, 2 and 7 this closed hydraulic circuit will be described in relation to its function with the machine.

In Figure 2 it will be seen that a triangle may be drawn by dropping a vertical line X from the point where the leading edge LE of the vane 51 meets the surface of the conical central hub 55, and by drawing an extension Y of the trailing edge TE of the vane to meet this vertical line. The third side of the triangle is formed by the surface of the conical hub 55. The triangle is indicated in Figure 3 as having sides X, Y and Z where X equals the chord length of the vane 51, Y equals the horizontal distance between the end of the trailing edge and the end of the leading edge of the vane and Z is the hypotenuse of the triangle formed by the surface of the conical hub 55. Referring now to Figure 7 it will be seen that the length of travel of the piston in cylinder 37 is equal to the length of side X of the triangle shown in Figure 2. Similarly, the length of travel of the piston in cylinder 40 is equal to the length of side Y of the triangle.

Piston rod 56 of cylinder 40 carries micro switch MS3 and, referring now to Figure 1, can be seen to maintain it in the position where it will be contacted by contact arm 54 on bracket 44 on the underside of table 12. The piston rod 30 of cylinder 29 is provided with a lateral stub shaft 34 which engages bracket 35 on the end of piston rod 36 of cylinder 37. As a result, when cylinder 29 is supplied with high pressure fluid through lead 32 to lower the cutters 27 the rod 34 will, through bracket 35, cause piston rod 36 to move downwardly in cylinder 37. Since cylinder 37 is of identical volume to cylinder 40 but of different length and diameter the entry of fluid from cylinder 37 to cylinder 40 by means of conduit 39 will cause a movement in piston 56 of cylinder 40 in the same proportion as is the proportion relationship between X and Y. In other words, the movement of piston rod 36 in cylinder 37 will bear the same relationship to the movement of piston rod 56 in cylinder 40 as does the length of side X to the length of side Y. It will be seen, accordingly, from Figure 1 that every time the cutting assembly moves downwardly the piston rod 36 in cylinder 37 will be caused to move downwardly an equal distance which will cause fluid to enter cylinder 40 and which will advance microswitch MS3 (in Figure 1) to the right or closer to microswitch MS2. As a result, with each downward movement of the cutters 27 the horizontal stroke of the table will be shortened since the contact arm 54 on bracket 44 will engage micro switch MS3 slightly sooner to exactly compensate for the slope of the surface of the conical central hub 55.

In order that microswitch MS1 will not be operated by contact member 123 on the upstroke of the cutter assembly, it is so constructed that it will be operated when engaged by member 123 moving in the downward direction. This is also true of microswitch MS5. Microswitch MS4 however, is so arranged that it will be operated only on the upstroke of member 123.

From the above description it will be recognized that a milling machine has been invented which accomplishes the objects as set forth earlier in this specification. The embodiment illustrated is a preferred embodiment but minor modifications may be made in the structure and arrangement of parts without departing from the spirit of the invention or the scope of the appended claims.

What I claim as my invention is:

1. In a milling machine having a base, a table mounted for reciprocation on the base and adapted to carry a workpiece, a cutter mounted for sliding movement in a plane normal to the plane of reciprocation of the table, and means to index the cutter towards the table at one end of each reciprocation of the table; structure integrating the movement of the table relative to the cutter so that the cutter will, at the other end of each reciprocation of the table, lie at a point relative to the table which is on the generatrix of a cone, the axis of the cone being parallel to the plane in which the cutter moves said structure comprising a first stationary hydraulic cylinder the axis of which is parallel to the general direction of travel of the cutter having a piston moving with the cutter, a second stationary hydraulic cylinder having a piston and piston rod the axes of which are parallel to the direction of reciprocation of the table, the two cylinders being of identical volume and in a closed hydraulic circuit and stop means mounted on the piston rod of the second cylinder to limit the movement of the table in one direction.

2. In a milling machine having a base, a table mounted for reciprocation on the base and adapted to carry a workpiece, a cutter mounted for sliding movement in a plane normal to the plane of reciprocation of the table, and means to index the cutter towards the table at one end of each reciprocation of the table; structure integrating the movement of the table relative to the cutter so that the cutter will, at the other end of each reciprocation of the table lie at a point relative to the table which is on the generatriv of a cone, the axis of the cone being parallel to the plane in which the cutter moves, said structure comprising a first stationary hydraulic cylinder having a piston moving with the cutter, a second stationary hydraulic cylinder having a piston and piston rod, the two cylinders being of identical volume and in a closed hydraulic circuit the length of travel of the piston in the first cylinder being proportional to the height of the cone and the length of travel of the piston in the second cylinder is proportional to the radius of the base of the cone and electrical means mounted on the piston rod of the second cylinder to limit the movement of the table in one direction and initiate movement of the table in the reverse direction.

References Cited in the file of this patent

UNITED STATES PATENTS

| | | |
|---|---|---|
| 2,357,790 | Turchan et al. | Sept. 5, 1944 |
| 2,485,716 | Eberlein et al. | Oct. 25, 1949 |
| 2,707,321 | Breisch | May 3, 1955 |
| 2,722,867 | Dackor et al. | Nov. 8, 1955 |
| 2,761,356 | Scherrer | Sept. 4, 1956 |